(12) United States Patent
Kirkpatrick et al.

(10) Patent No.: US 7,290,628 B2
(45) Date of Patent: Nov. 6, 2007

(54) PERSONAL TRANSPORT VEHICLE SYSTEM AND METHOD

(75) Inventors: James R. Kirkpatrick, Woodland Hills, CA (US); Joshua D. McDonald, Sacramento, CA (US)

(73) Assignee: American Chariot Company, San Francisco, CA (US)

( * ) Notice: Subject to any disclaimer, the term of this patent is extended or adjusted under 35 U.S.C. 154(b) by 159 days.

(21) Appl. No.: 10/933,203

(22) Filed: Sep. 2, 2004

(65) Prior Publication Data

US 2006/0042844 A1    Mar. 2, 2006

(51) Int. Cl.
*B60K 1/00* (2006.01)

(52) U.S. Cl. ............... 180/65.1; 180/180; 180/210; 180/908

(58) Field of Classification Search ........... 180/65.1, 180/180, 181, 210, 21, 908
See application file for complete search history.

(56) References Cited

U.S. PATENT DOCUMENTS

| | | | | |
|---|---|---|---|---|
| 3,603,609 | A * | 9/1971 | Hott et al. | 280/62 |
| 4,087,107 | A * | 5/1978 | Winchell | 280/220 |
| 4,221,276 | A * | 9/1980 | Mitchell et al. | 180/209 |
| 4,313,517 | A * | 2/1982 | Pivar | 180/216 |
| 4,325,565 | A * | 4/1982 | Winchell | 280/282 |
| 4,356,876 | A * | 11/1982 | Watanabe et al. | 180/210 |
| 4,415,056 | A * | 11/1983 | Smith | 180/210 |
| 4,757,868 | A * | 7/1988 | Cresswell | 180/11 |
| 5,150,762 | A * | 9/1992 | Stegeman et al. | 180/208 |
| 5,477,937 | A * | 12/1995 | Chagnon | 180/24.01 |
| 5,823,025 | A * | 10/1998 | Phifer | 70/226 |
| 5,894,898 | A * | 4/1999 | Catto | 180/2.2 |
| 6,050,357 | A * | 4/2000 | Staelin et al. | 180/65.1 |
| D427,945 | S | 7/2000 | Kirkpatrick | |
| D428,364 | S | 7/2000 | Kirkpatrick | |
| 6,186,256 | B1 * | 2/2001 | Dignitti | 180/68.5 |
| 6,334,269 | B1 * | 1/2002 | Dilks | 37/235 |
| 6,488,130 | B1 * | 12/2002 | Bermel | 188/19 |
| 6,695,081 | B2 * | 2/2004 | Chu et al. | 180/65.1 |
| 6,722,460 | B2 * | 4/2004 | Yang et al. | 180/220 |
| 6,766,876 | B2 * | 7/2004 | Ozeki et al. | 180/311 |
| 2003/0127266 | A1 | 7/2003 | Kirkpatrick | |

* cited by examiner

*Primary Examiner*—Christopher P. Ellis
*Assistant Examiner*—Brian Swenson
(74) *Attorney, Agent, or Firm*—Fulwider Patton LLP

(57) ABSTRACT

In a system and method for enabling a person to be transported in a personal transport vehicle, the vehicle includes smoothly operable controls and a safety user-positioning strip. The vehicle further includes a power source rapid disconnection and connection system for recharge and replacement and for secure connection. Also, the vehicle may include a safety speed regulator, and a bi-directional safety braking system. Further, the vehicle includes a preferential drive sharp-turns enabling system. The vehicle further includes an initially-flat indicia-applicable cowling. It may also include a protective security lock, a further or alternative braking system, and a trailer for enabling the carrying of items, and may be readily separable for shipping.

29 Claims, 20 Drawing Sheets

PERSONAL TRANSPORT VEHICLE SYSTEM AND METHOD

BACKGROUND OF THE INVENTION

1. Field of the Invention

This invention is generally related to vehicles, and more particularly, to a personal transport vehicle for enabling a person to be effectively transported thereby.

2. General Background and State of the Art

It is known to enable a person to be transported by a personal motorized vehicle such as a two-wheel motorized scooter or a motorized bicycle.

However, it would be desirable to provide a personal transport vehicle which would enable a person to operate the vehicle in an efficient and effective manner. It would further be desirable to require the person to be safely positioned in the vehicle before the vehicle is operable. It would still further be desirable to enable the vehicle to be operable to provide smooth movement and to prevent jerky movement thereof. Moreover, it would be desirable to enable rapid replacement and ensure secure connection of the power source for the vehicle for enabling continuing operation of the vehicle.

It would also be desirable to enable safety regulation of the speed of the vehicle in areas of vehicle operation. Still further, it would be desirable to enable safe braking of the vehicle in the forward or reverse direction of movement thereof. Also, it would be desirable to enable making sharp turns with the vehicle when desired or required. Moreover, it would be desirable to enable the application of indicia on the vehicle for specific identifying purposes, and to enable the vehicle to be securely lockable to prevent theft thereof. Furthermore, it would be desirable to enable the vehicle to be manufactured in readily separable sub-assemblies to enable efficient shipping thereof, to provide a different type of braking system for safety purposes, and to enable the person to transport additional items as desired or needed.

Therefore, there has been identified a continuing need to provide a personal transport vehicle for enabling a person to be transported in an effective and efficient manner.

INVENTION SUMMARY

Briefly, and in general terms, the present invention, in a preferred embodiment, by way of example, is directed to a system for enabling a person to be transported, comprising a multiple-wheel motorized personal transport vehicle. The vehicle includes a cab, multiple wheels, on which the cab is mounted, a motor, connected to at least one of the multiple wheels, and a power element, for providing power to the motor. The vehicle also includes a switch for enabling starting of the motor, a steering element for enabling steering of the vehicle, and an accelerator, mounted on the steering element. The vehicle enables a person to stand in the cab, activate the switch, the power element, and the motor, activate the accelerator, steer the steering element, and be transported in the cab on the multiple wheels.

In accordance with aspects of the invention, there is provided a personal transport vehicle for enabling a person to effectively and efficiently operate the vehicle, a safety strip for requiring safe positioning of the user before enabling operation thereof, and a smoothly operable throttle and motors to prevent jerky movement.

In other aspects of the invention, the vehicle includes a power source rapid locking and releasing system, for enabling rapid disconnection for recharging or replacement, and also to enable secure connection for efficient continuing vehicle operation. The vehicle may also include a speed regulator for enabling safe operation in various areas of operation thereof. It may further include a bi-directional braking system for safe braking in the forward and reverse directions.

In yet other aspects of the invention, the vehicle includes a preferential drive for enabling sharp turns to be executed in the operation of the vehicle. It also includes an initially flat cowling conveniently able to have indicia applied thereto and to then be mounted on the vehicle, and it may further include a security lock for preventing theft. The vehicle may be readily disassembled for convenient shipping, may include a further or alternative safety braking system, and may include a system for enabling items to be efficiently transported thereby.

DETAILED DESCRIPTION OF THE PREFERRED EMBODIMENTS

Figure 1:
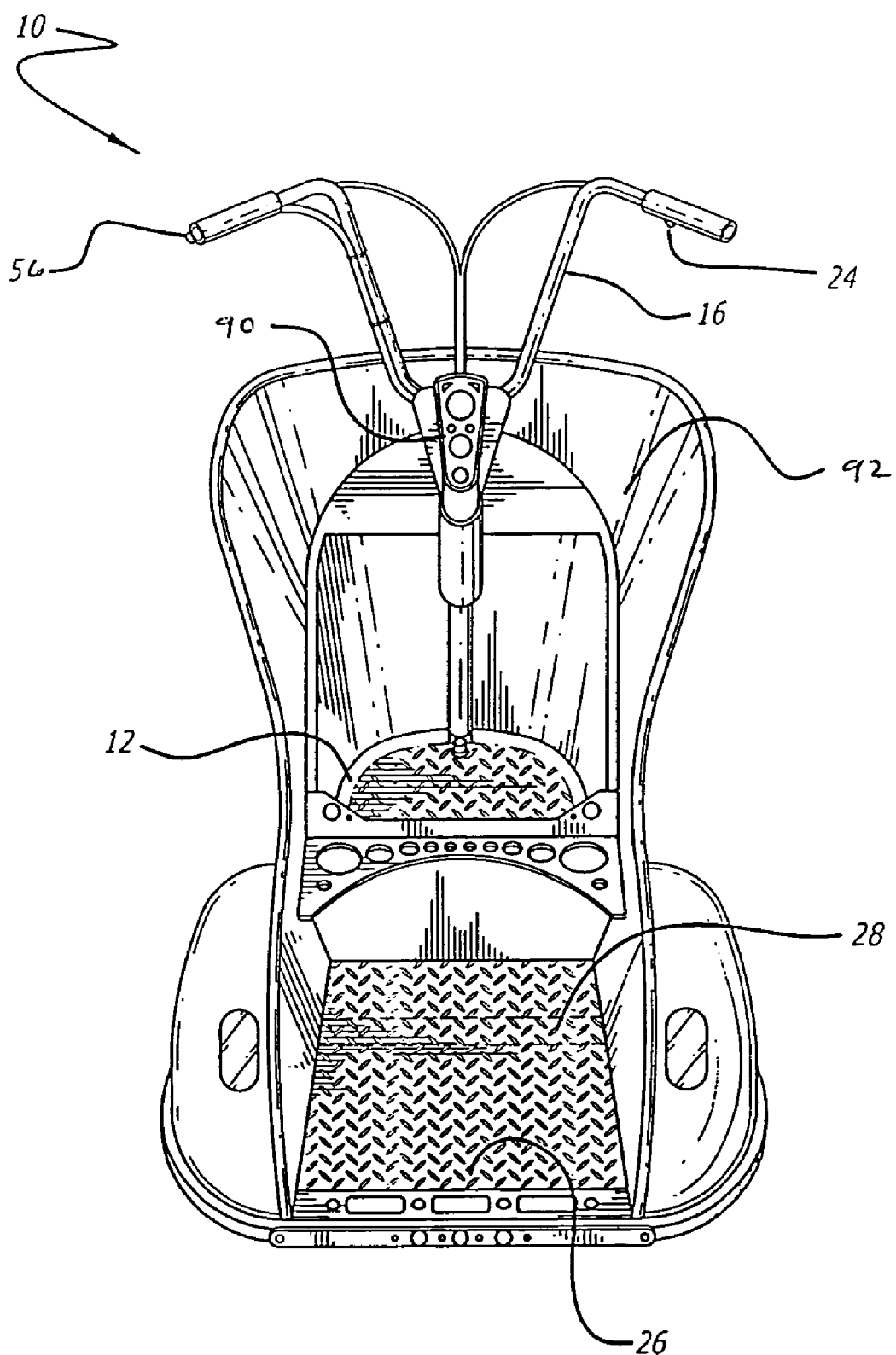
FIG. 1 is a top rear perspective view of a personal transport vehicle in accordance with aspects of the present invention.

Referring to the drawings, in which like reference numerals refer to like or corresponding parts, the system 10 according to the invention comprises a personal transport vehicle which enables a person to be transported thereby. The vehicle 10 may include components which are comprised of a lightweight strong material. The material may comprise steel, aluminum, stainless steel, or titanium.

Figure 2:
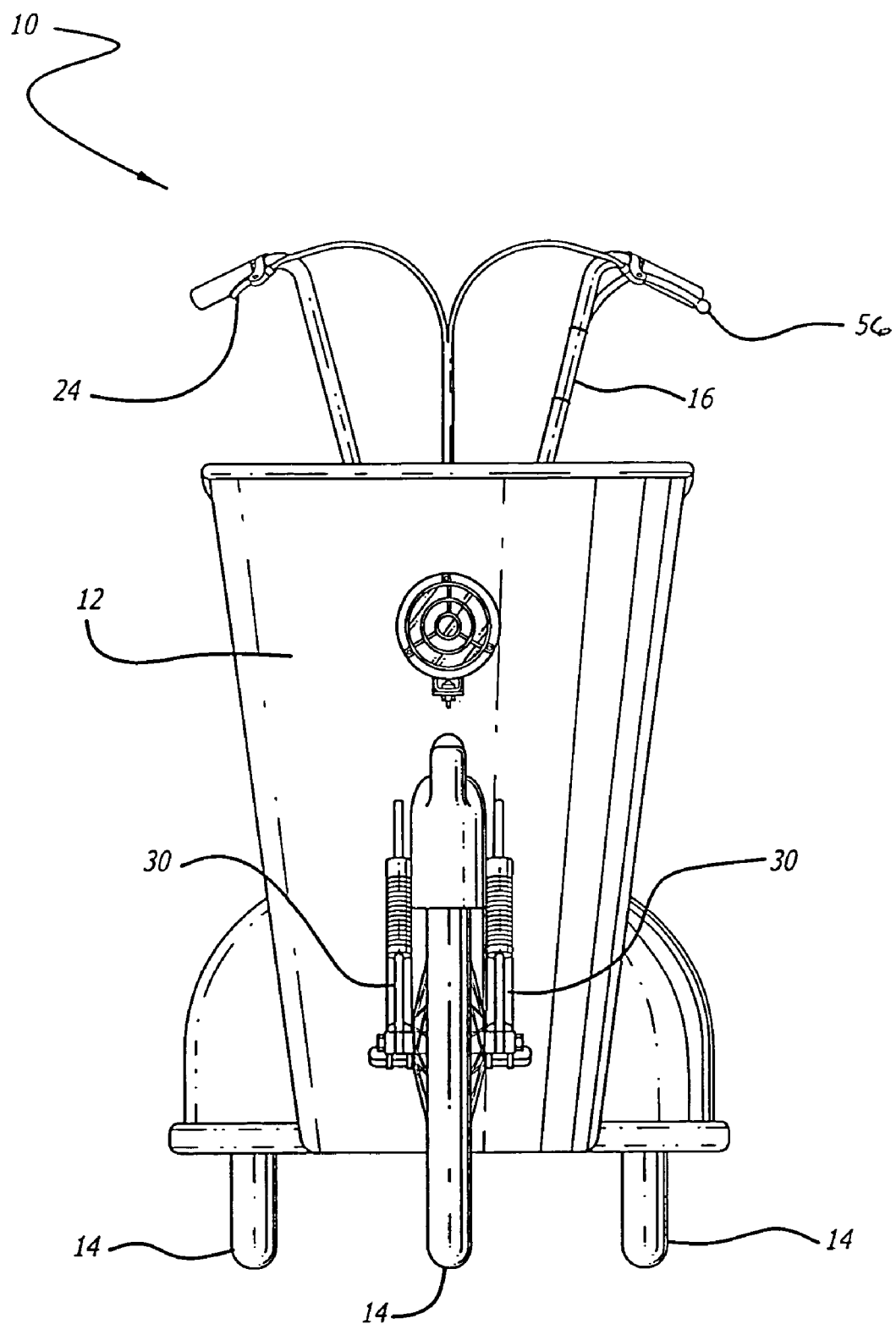
FIG. 2 is a front elevational view of a personal transport vehicle.
Figure 3:
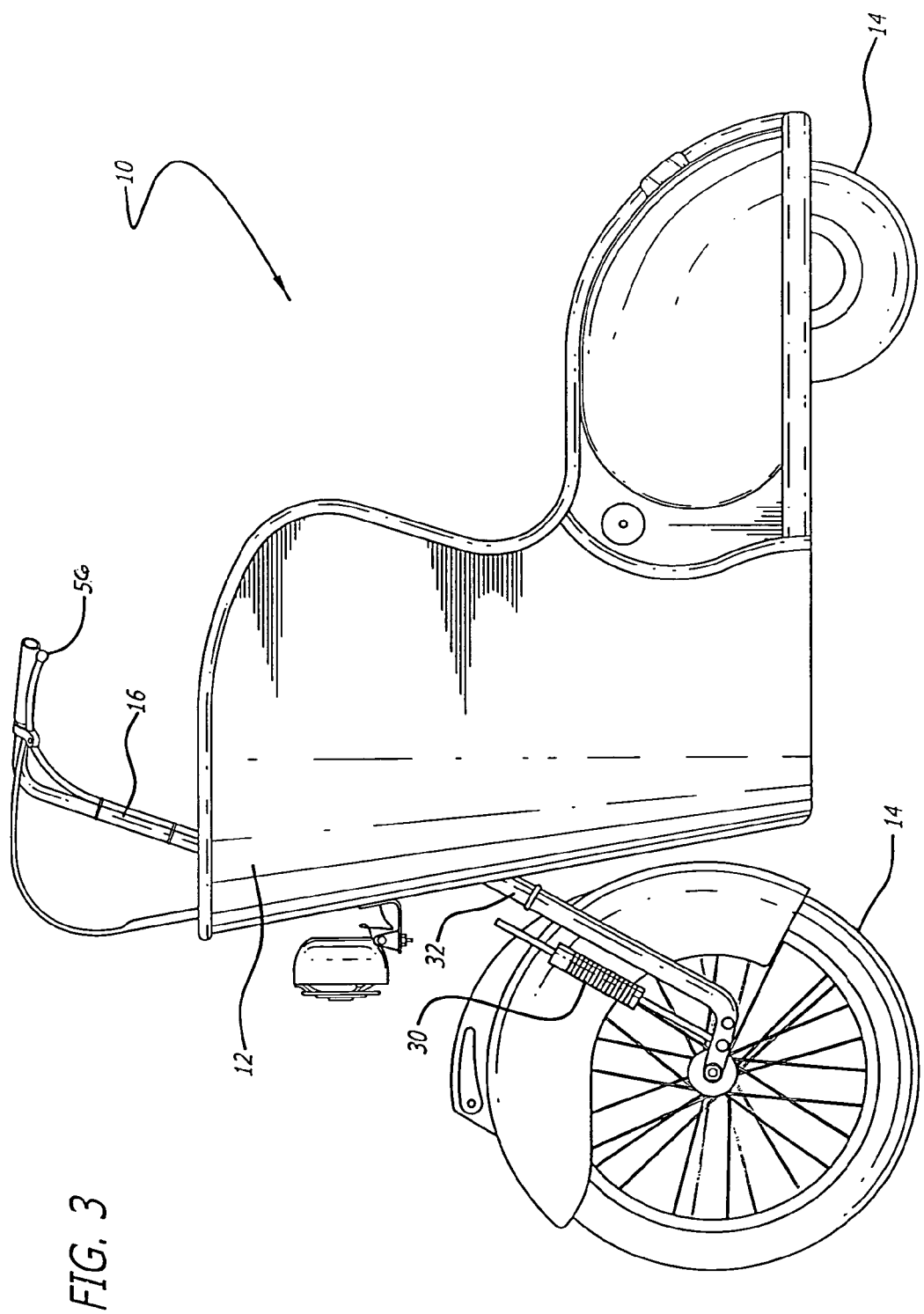
FIG. 3 is a side elevational view of a personal transport vehicle.

FIGS. 1-3 present a vehicle 10 in accordance with the invention, which includes a cab 12, multiple wheels 14 on which the cab 12 is mounted, and a steering element 16 for enabling steering of the vehicle 10. The vehicle 10, as further seen in the electrical circuit in FIG. 4, also includes a motor 18 connected to at least one of the multiple wheels 14, a power element 20 for providing power to the motor 18, a switch 22 such as a keyswitch for enabling starting of the motor 18, and an accelerator 24 mounted on the steering element 16. The vehicle 10 enables a person to stand in the cab 12, activate the starter 22, the power element 20, and the motor 18, activate the accelerator 24, steer the steering element 16, and be transported in the cab 12 on the multiple wheels 14. The accelerator 24 may comprise a throttle.

Figure 6:
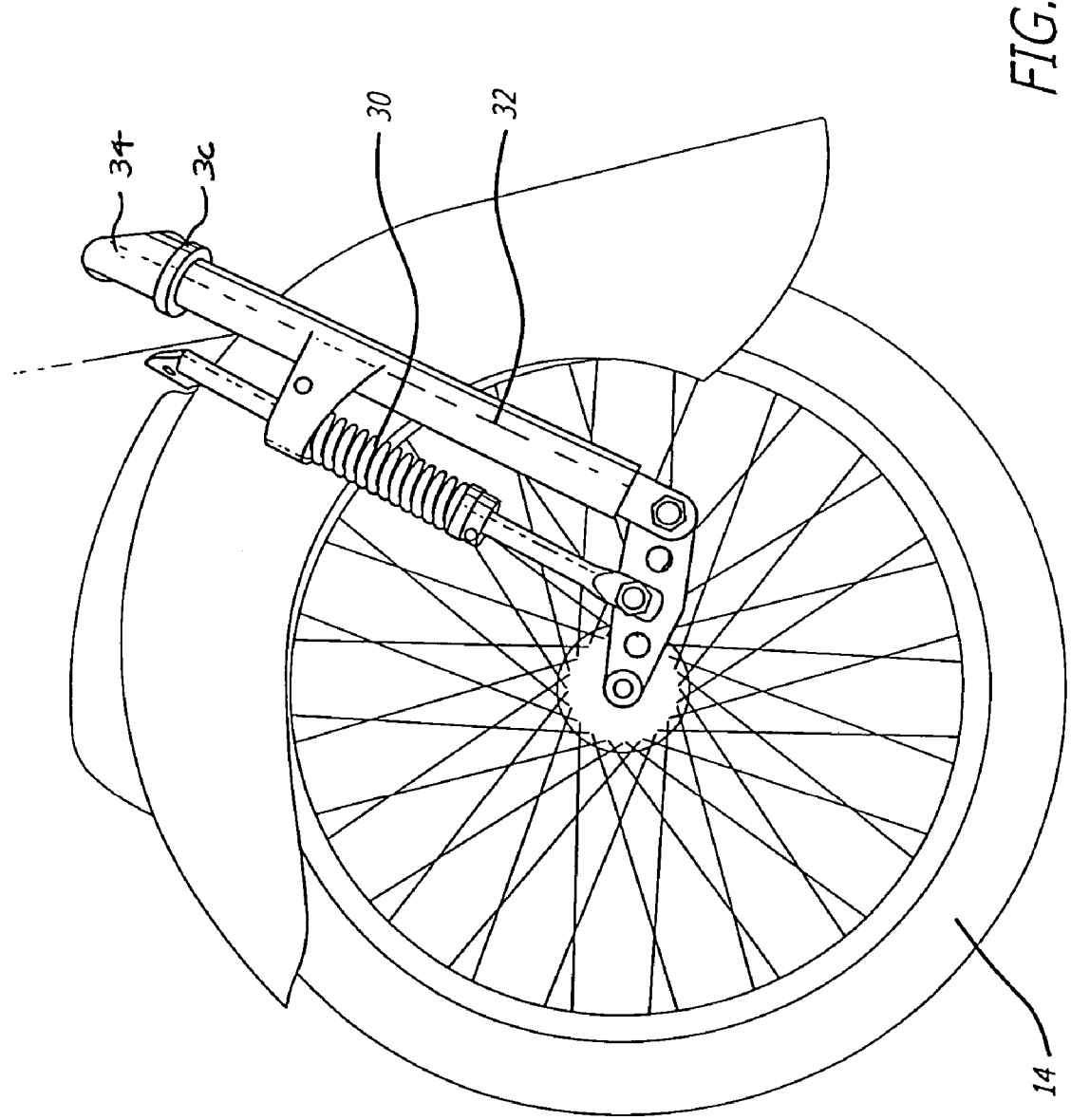
FIG. 6 is an elevational view of a front wheel and a suspension system therefor in a personal transport vehicle in accordance with the present invention.
Figure 7:
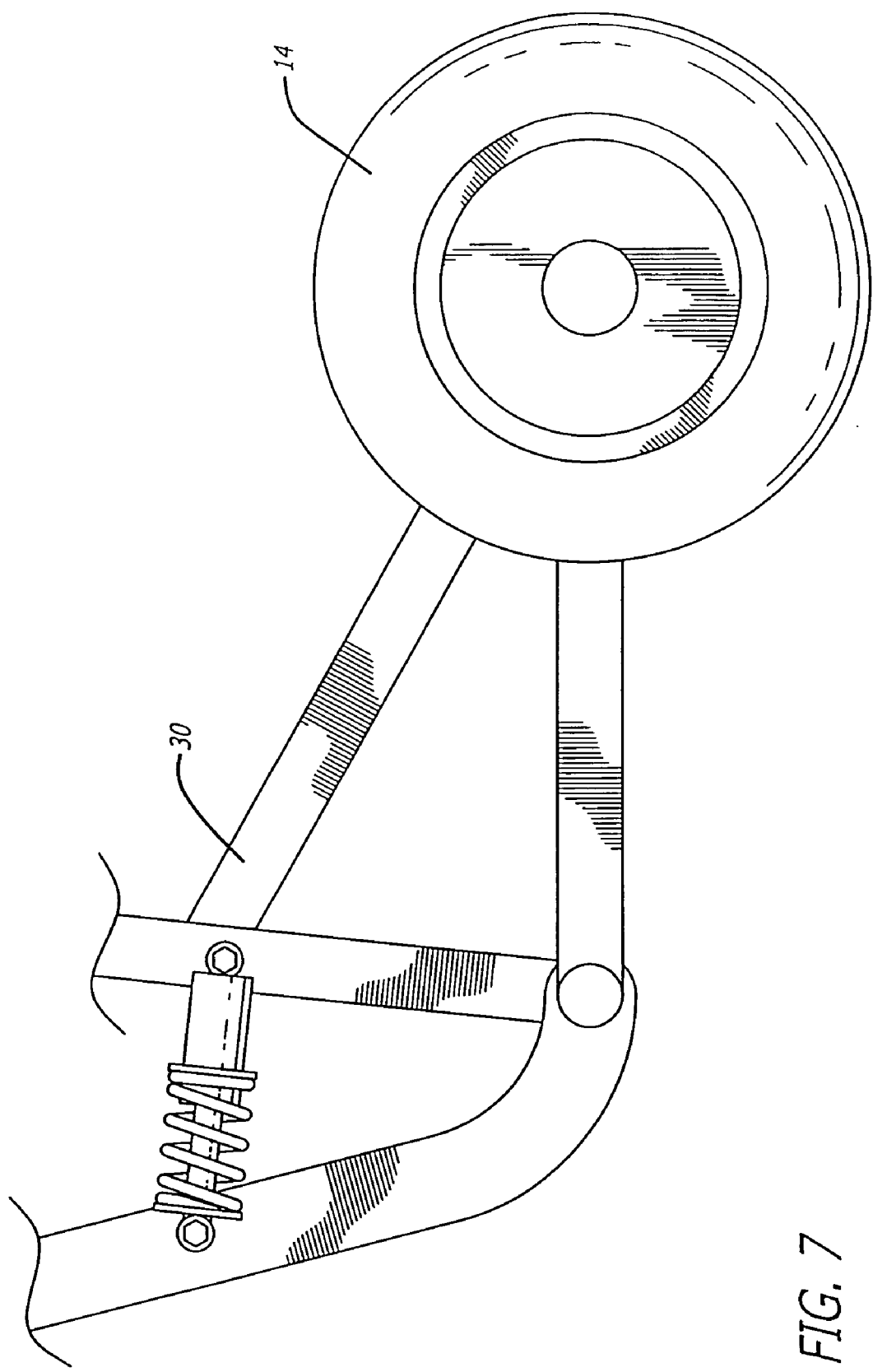
FIG. 7 is an elevational view of a rear side wheel and a suspension system therefor in a personal transport vehicle.

The cab 12 of the vehicle 10 includes a floor 26, and the vehicle 10 further comprises an electrical safety strip 28, positionable on the floor 26 of the cab 12 at a forward location, which keeps the weight of the person forward in the vehicle 10 for safety, whereby the vehicle 10 does not move unless the person is standing on the strip 28. The multiple wheels 14 may each include a suspension 30, as seen in FIGS. 6-7, such as a spring-loaded front wheel suspension, and a swing arm rear wheel suspension. The multiple wheels 14 of the vehicle 10 include a pair of wheels, each of which is positioned on a side of the cab 12, and a third wheel, positioned in front of the cab 12. Each of the pair of side wheels may include a motor 18 associated therewith. The front third wheel, as depicted in FIG. 8, may include a motor 18 associated therewith, which, in a front-wheel drive version, may be the only wheel which includes a motor 18 associated therewith.

Figure 8:
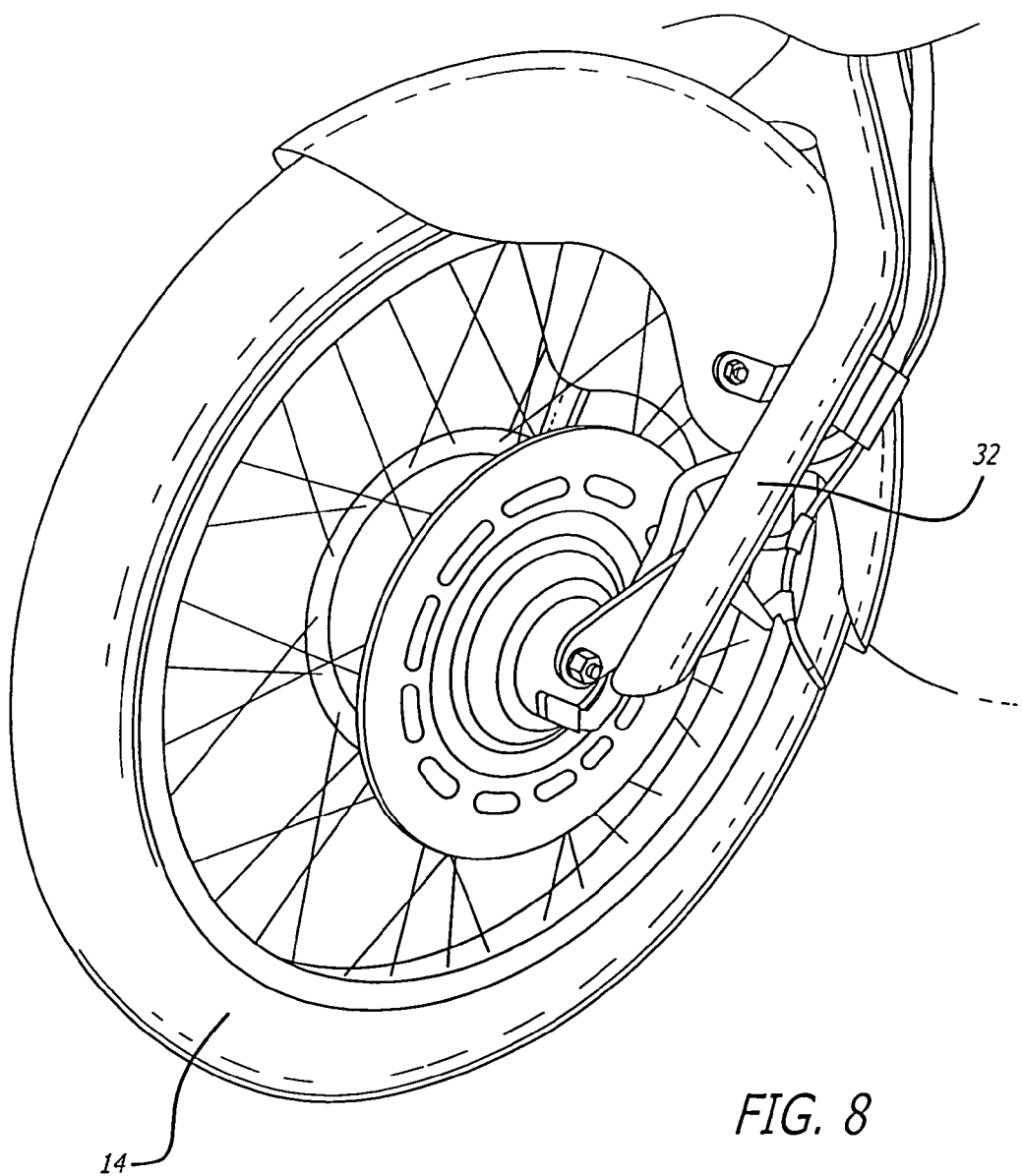
FIG. 8 is a perspective view of a front wheel and a drive system therefor in a personal transport vehicle.

The steering element 16 comprises handlebars, further including a fork 32, as illustrated in FIGS. 6 and 8, able to be secured to and to enable adjustment of the handlebars 16 at a head angle between the handlebars 16 and the fork 32 which may be maintained so as to maintain the adjustment thereof upon removal of the handlebars 16 and the fork 32 for shipping thereof. The fork 32 includes a head tube 34, and a fork bearing 36. Upon taking off the handlebars 16, the fork bearing 36 that holds the fork 32 in the frame maintains the tension and adjustment of the head angle between the head tube 34 and the ground. The relationship between the head angle and a vehicle axle is able to determine the trail, comprising the distance on the ground, for enabling the torque to be fixed. The vehicle 10 is substantially lightweight such that upon an adult rider turning the handlebars 16, the position of the handlebars 16 causes the adult rider to lean in the direction of such turn. The motors 18 are able to be underpowered, such that upon activating the throttle 24, the movement of the vehicle 10 is substantially smooth and not jerky. The motor 18 may further include a thermal control to control the heat and prevent burnout.

Figure 5:
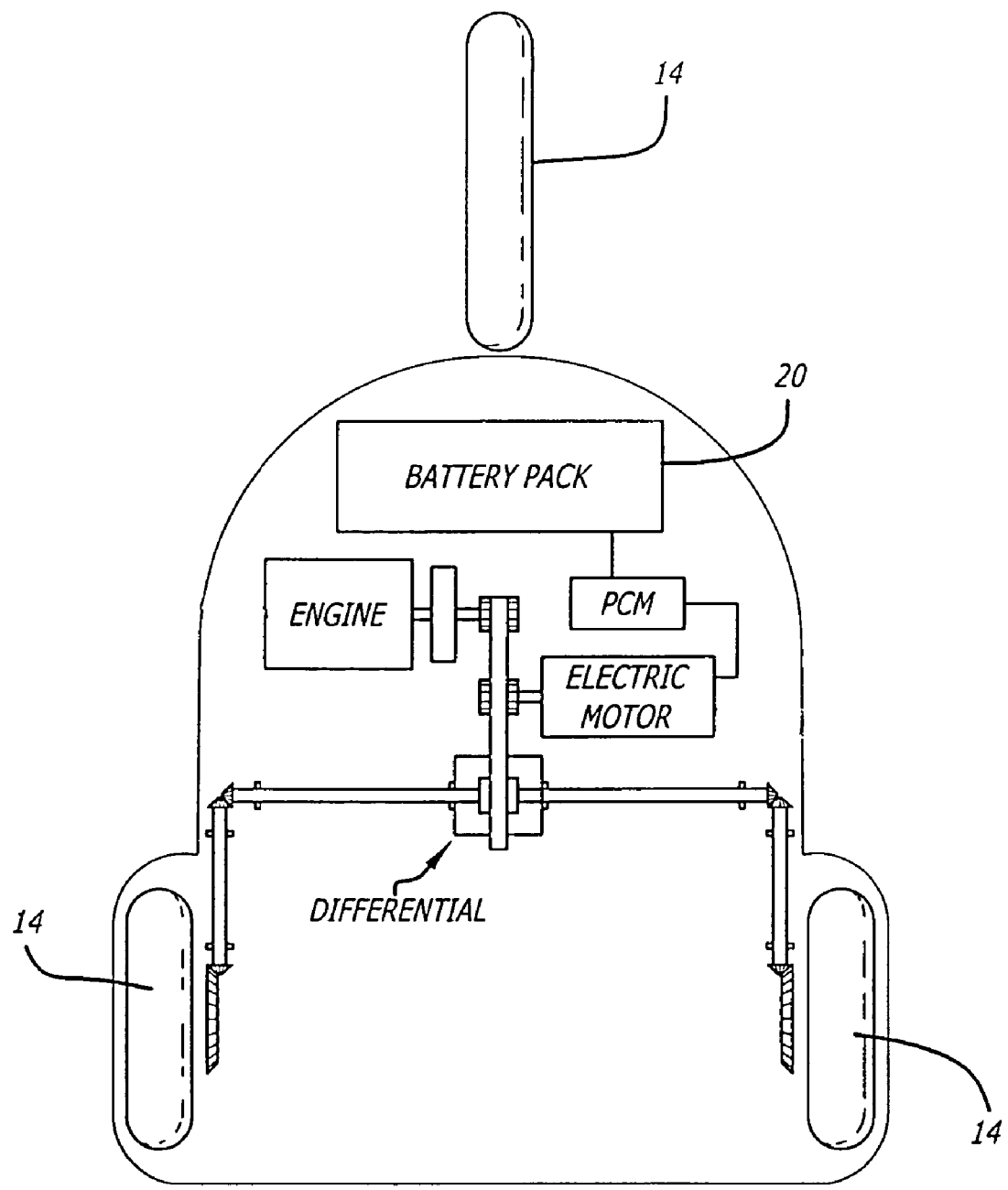
FIG. 5 is a top schematic view of a hybrid power drive system for a personal transport vehicle.
Figure 9:
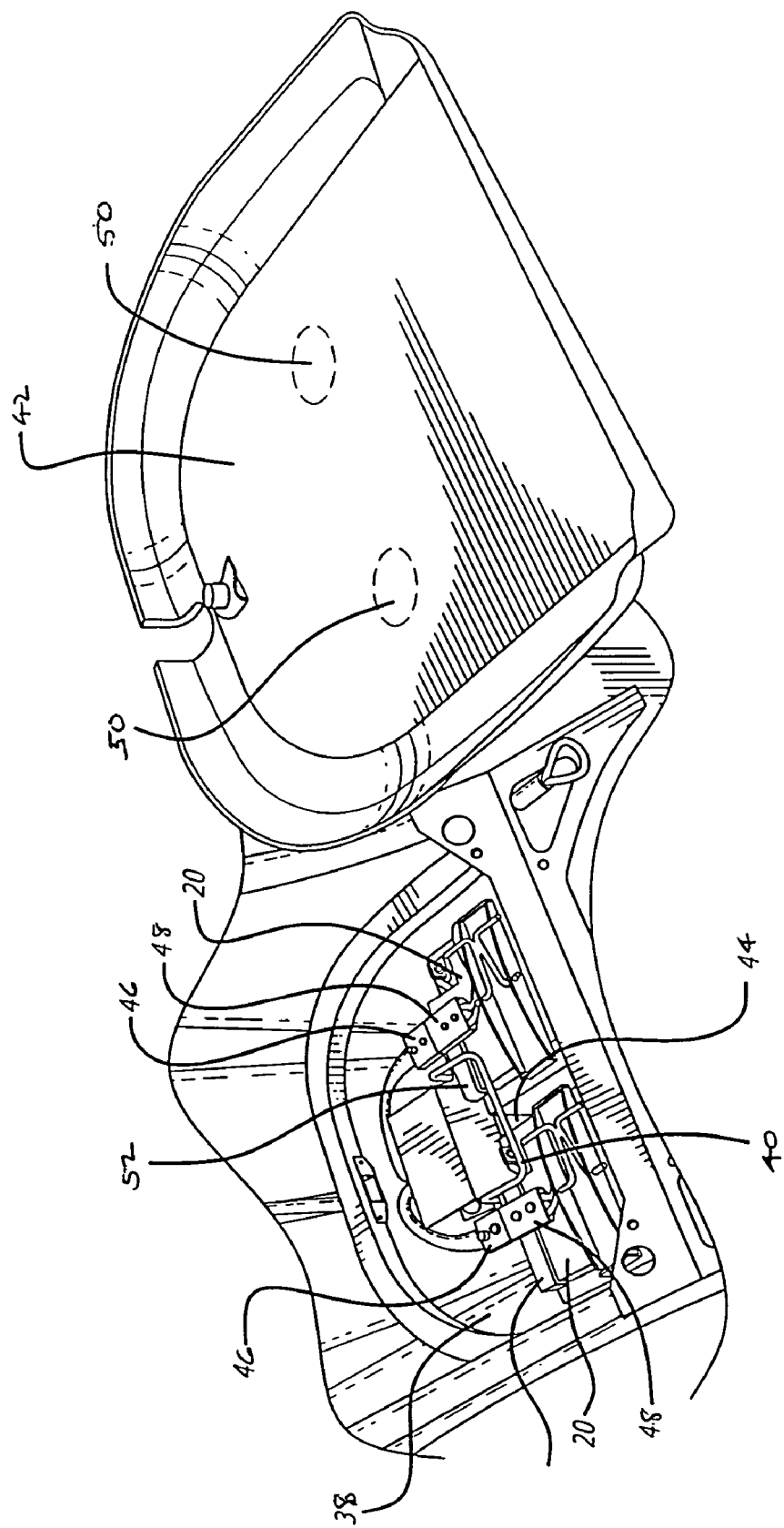
FIG. 9 is a partly-exploded view of a battery compartment with batteries mounted therein and a compartment cover in a personal transport vehicle in accordance with the present invention.
Figure 10:
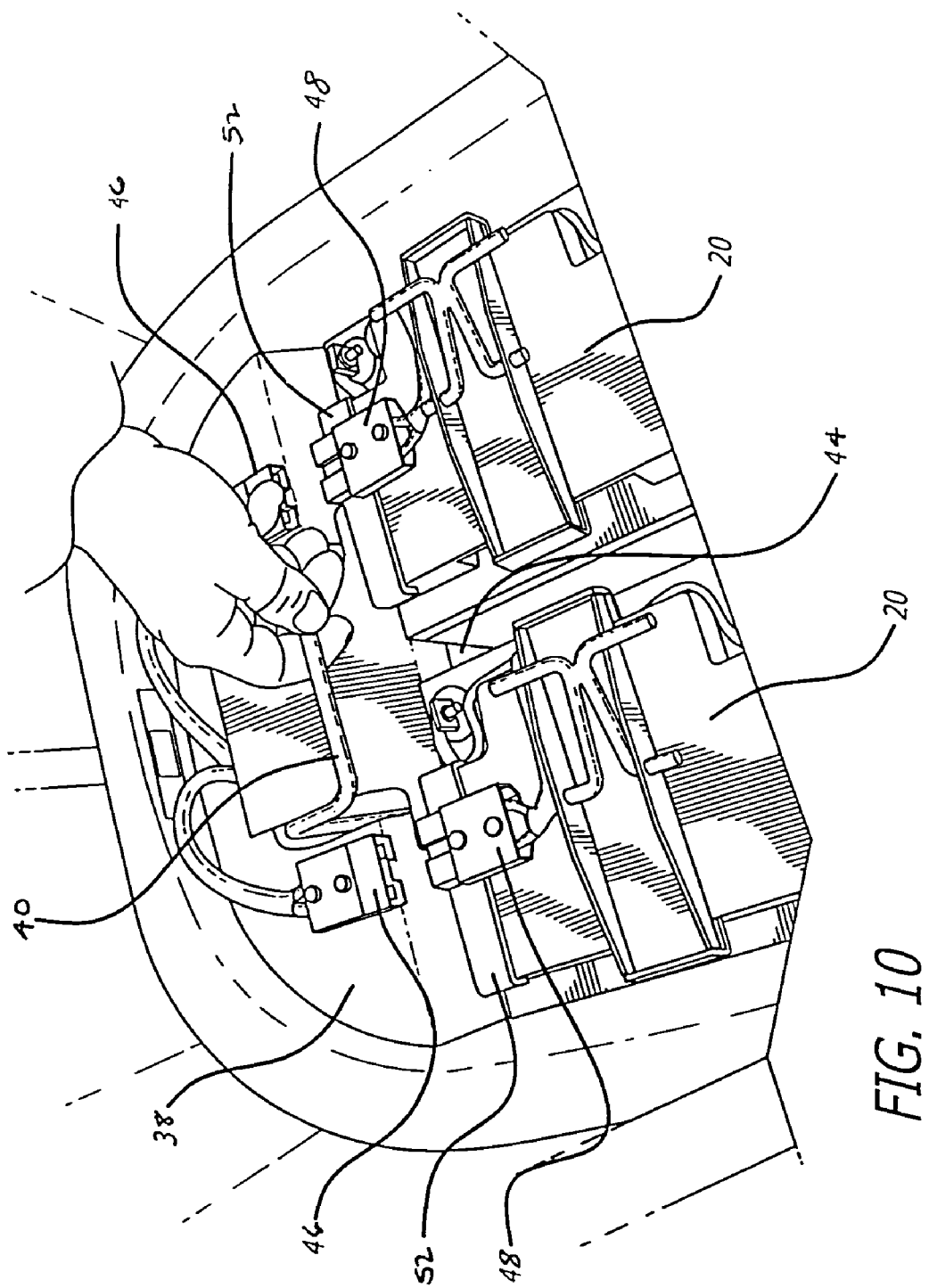
FIG. 10 is a perspective view of a battery compartment with a user disconnecting the batteries in a personal transport vehicle.
Figure 11:
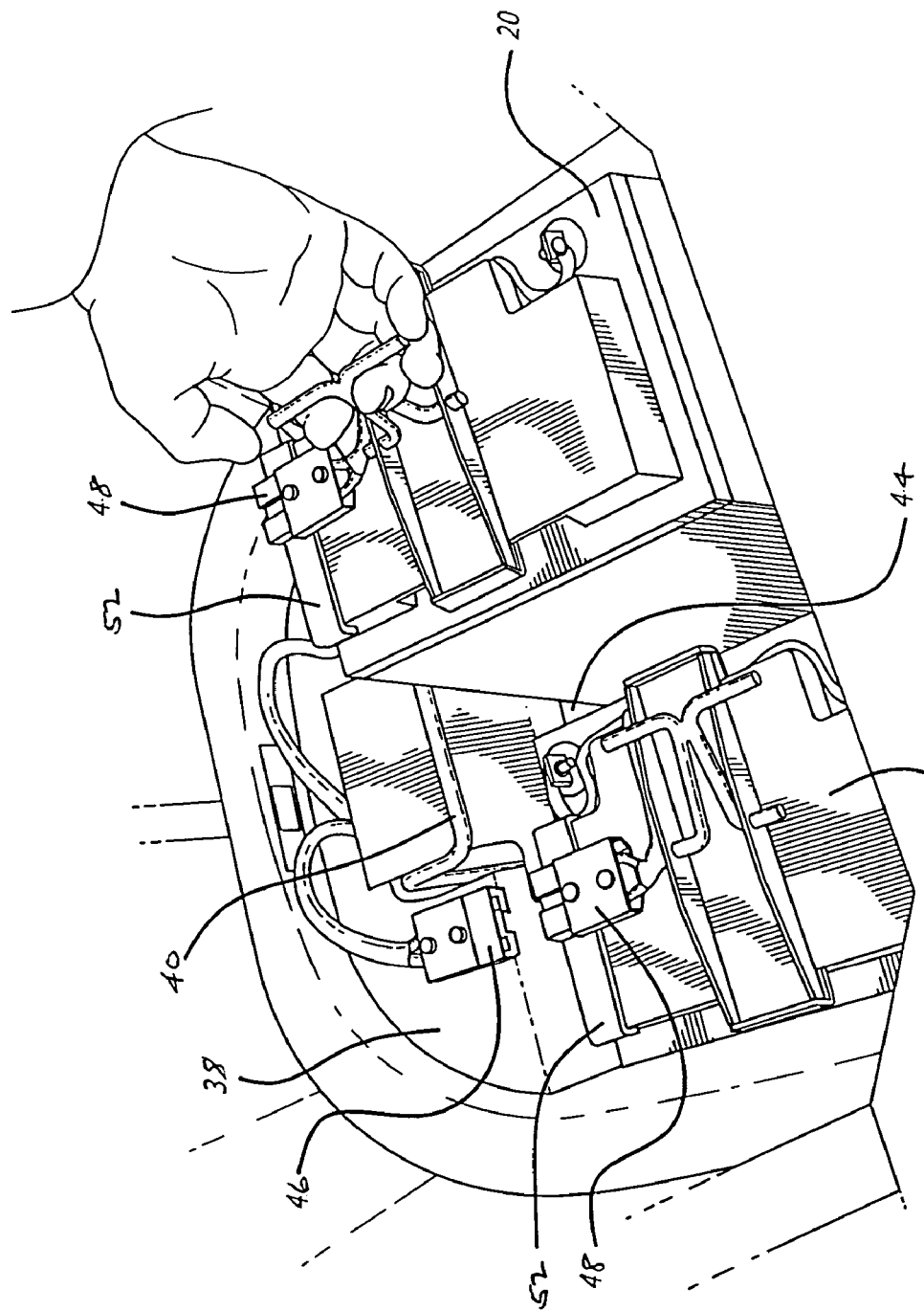
FIG. 11 is a perspective view of a battery compartment with a user removing a battery in a personal transport vehicle.

Referring to FIGS. 9-11, the power element 20 may comprise a battery, and the vehicle 10 may further include a battery compartment 38, able to enable the battery 20 to be positioned therein and removed therefrom, and a battery locking and rapidly releasing element 40, able to enable locking of the battery 20 in the battery compartment 38 and rapid release of the battery 20 to enable rapid recharging or replacement thereof. The vehicle 10 may further include a plurality of battery compartments 38 for a plurality of batteries 20, such as two twelve volt batteries, able to enable the plurality of batteries 20 to be installed in series, removed individually, and charged in parallel. The battery compartment 38 and the floor 26 of the vehicle 10 enable the battery 20 to be held in place. The power element 20 may alternatively comprise a gas cell, a hybrid combination of gas and electric power as depicted in FIG. 5, or a fuel cell.

The battery locking and rapidly releasing element 40 comprises a battery compartment lever, able to be pivotally movable between a battery connecting and locking position, upon locking the lever 40 down, and a battery disconnecting and rapidly releasing position, upon lifting the lever 40 up, which also enables lifting the battery 20 out and installing a recharged or new battery 20 therein. The battery compartment 38 includes a portion 42 of the cab floor 26 and a battery tray 44, and the battery locking and rapidly releasing element 40 extends in through the cab floor portion 42. The cab floor portion 42 is removable to enable removal of a battery 20, and is not re-positionable until the battery disconnect lever 40 is in locking position and a battery plug 46 is mated with a plug socket 48 and plugged into a battery 20. The cab floor portion 42 further includes indentation notches 50, able to bear against the battery plugs 46 in the battery compartment 38, and prevent the battery plug 46 from becoming unplugged upon locking of the battery disconnect lever 40 and connection of the battery plug 46 with a battery 20. The indentation notches 50 are further able to prevent re-positioning of the cab floor portion 42 and operation of the vehicle 10 if the battery plug 46 is unplugged from a battery 20 or not properly mated with the plug sockets 48 since loose contacts may generate heat and melting.

The battery compartment 38 includes for each battery 20 the battery plug 46, connected in the vehicle electrical circuit, and also the plug socket 48 mounted on a plug slide 52, able to enable slidable movement of the plug socket 48 so as to enable the disconnection of the battery plug 46 from the battery 20, and to enable connection of the battery plug 46 to the battery 20. The cab floor portion 42 comes off, and will not go back on until the battery plug 46 is plugged in and the lever 40 is closed. Notches 50 in the floor portion 42 keep the battery plug 46 from becoming unplugged once the floor portion 42 is latched in place, in that if the battery plug 46 is unplugged, the notches 50 prevent the floor portion 42 from going down all the way.

In accordance with the invention, the throttle 24 is connected in the electrical circuit to the motor 18 which is connected to the wheel 14. The electrical circuit may further include a multiple-stage current limit switch for each motor 18, to delay when the revolutions per minute are below a preset level, so as to divide the acceleration over a period of time. It provides a delayed reaction time period upon applying full throttle to provide substantially smooth movement, which delay is bypassed when the revolutions per minute are above the preset level to provide substantially instantaneous response. The current-limit switch regulates the speed of the vehicle 10 through the motor 18 when the throttle 24 is engaged slowly up to a preset low speed limit point, for providing smooth and quiet movement of the vehicle 10 with little vibration, and upon passing the preset low speed limit point, to enable full throttle to the motor 18.

The vehicle 10 may also include a speed regulator 54, as for automatically controlling the maximum speed into the motor 18, which may for example comprise a switch for outdoor versus indoor speed control. The regulator 54 may comprise a smart regulator, able to regulate the vehicle speed dependent upon an external factor. The smart regulator 54 may comprise a smart system, including a microprocessor, for regulating speed dependent upon factors such as the person driving the vehicle 10, the time the vehicle 10 is being driven, and/or the location where the vehicle 10 is being driven. In the smart system, the user may enter a code in a dashboard keypad or swipe an identification card to activate the smart regulator. The vehicle 10 may further include a speed zone sensor, for sensing a speed zone code for regulating the vehicle speed, which may be able to interact with a speed zone emitter, able to emit a speed zone code to be sensed by the speed zone sensor. The speed zone sensor may comprise a radio sensor, or an optical sensor. The regulator 54 may be operable in conjunction with radio control and/or sensors in the surface on which the vehicle 10 is driven, to limit the maximum speed thereof.

Figure 12:
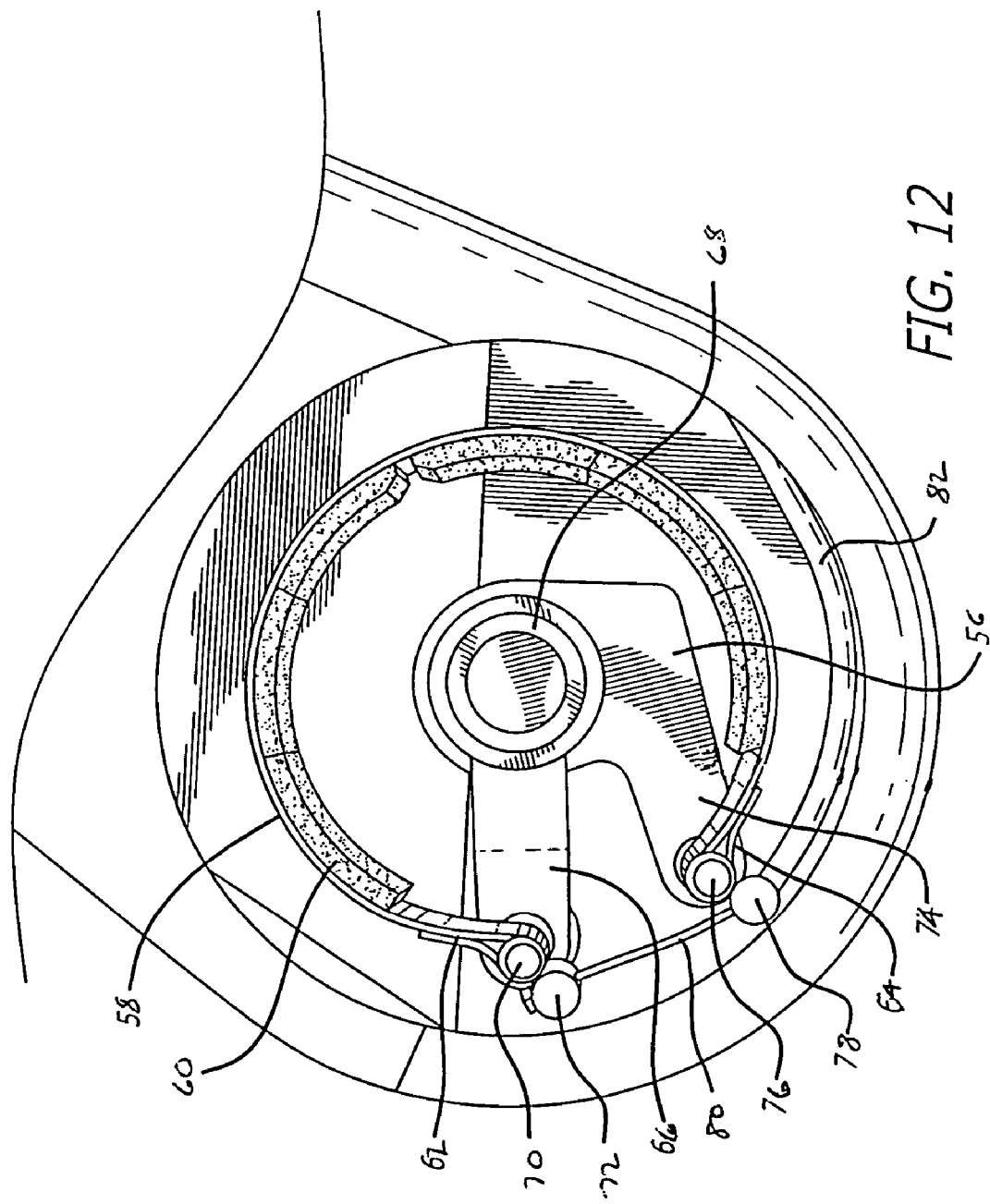
FIG. 12 is an elevational view of a bi-directional braking system in a personal transport vehicle in accordance with aspects of the present invention.
Figure 13:
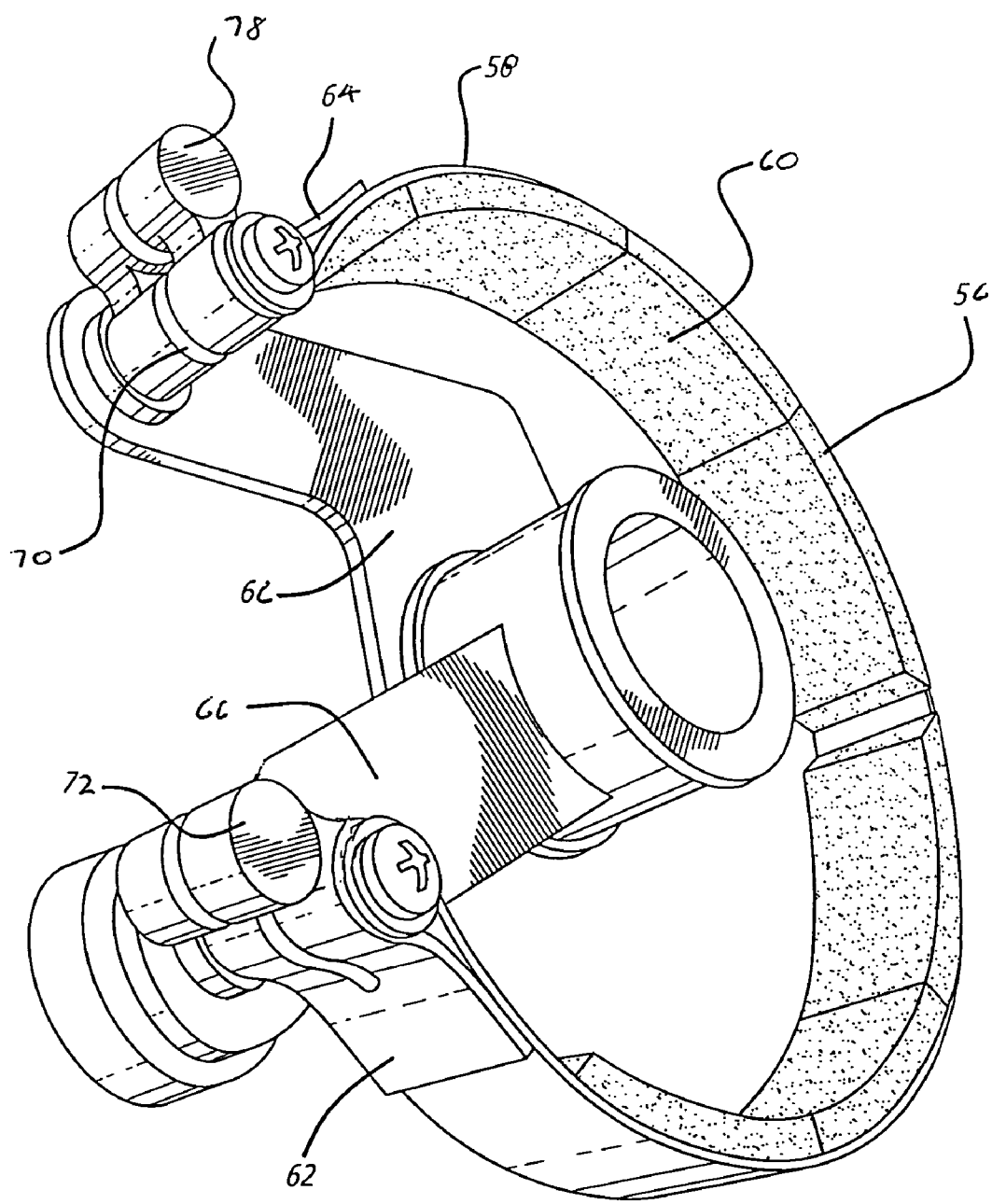
FIG. 13 is a perspective view of a bi-directional braking system in a personal transport vehicle in accordance with the present invention.

There is shown in FIGS. 12-13 a bi-directional band braking system 56 which may be included in the vehicle 10, and which includes (not shown) a brake lever, able to be actuated by a vehicle operator, a brake drum, a brake cable, connected to the brake lever, and a brake cable housing able to enclose the brake cable. The bi-directional braking system 56 further includes a band 58, able to extend about the brake drum, which includes braking-enabling lining material 60 on the inner surface, able to be pulled so as to bear against the brake drum, a first end 62, and a second opposed end 64. It further includes a first arm 66 which is secured to an axle 68 to rotate therewith, and which includes a first pin 70 secured to the first arm 66, and a first pin extension 72 secured to the band 58 proximate the first end 62 thereof. It also includes a second arm 74 which is secured to the axle 64 to rotate therewith, and which includes a second pin 76 secured to the second arm 74, and a second pin extension 78 secured to the band 58 proximate the second end 64 thereof.

A cable 80 is secured to the first pin extension 72 and the second pin extension 78, and extends therebetween and into a cable housing 82. The first pin extension 72 and the second pin extension 78, to which the cable 80 is secured, maintain the spacing of the first arm 66 and the second arm 74, by being secured to the band 58 at the locations of the first pin 70 secured to the first arm 66 and the second pin 76 secured to the second arm 74. A pair of stops (not shown, one pair for each wheel to be braked) are mounted on the vehicle chassis in the path of movement of one and the other of the first arm 66 and second arm 74, depending upon the direction of rotation of the vehicle wheel. For example, upon clockwise rotation of the vehicle wheels, and actuation of the bi-directional braking system 56, a stop in the path of clockwise movement of the first arm 66 would block movement thereof and brake the wheel, thereby braking the vehicle. Upon counterclockwise rotation of the vehicle wheels in such example, a stop would likewise block second arm 74 and brake the vehicle 10.

Figure 4:
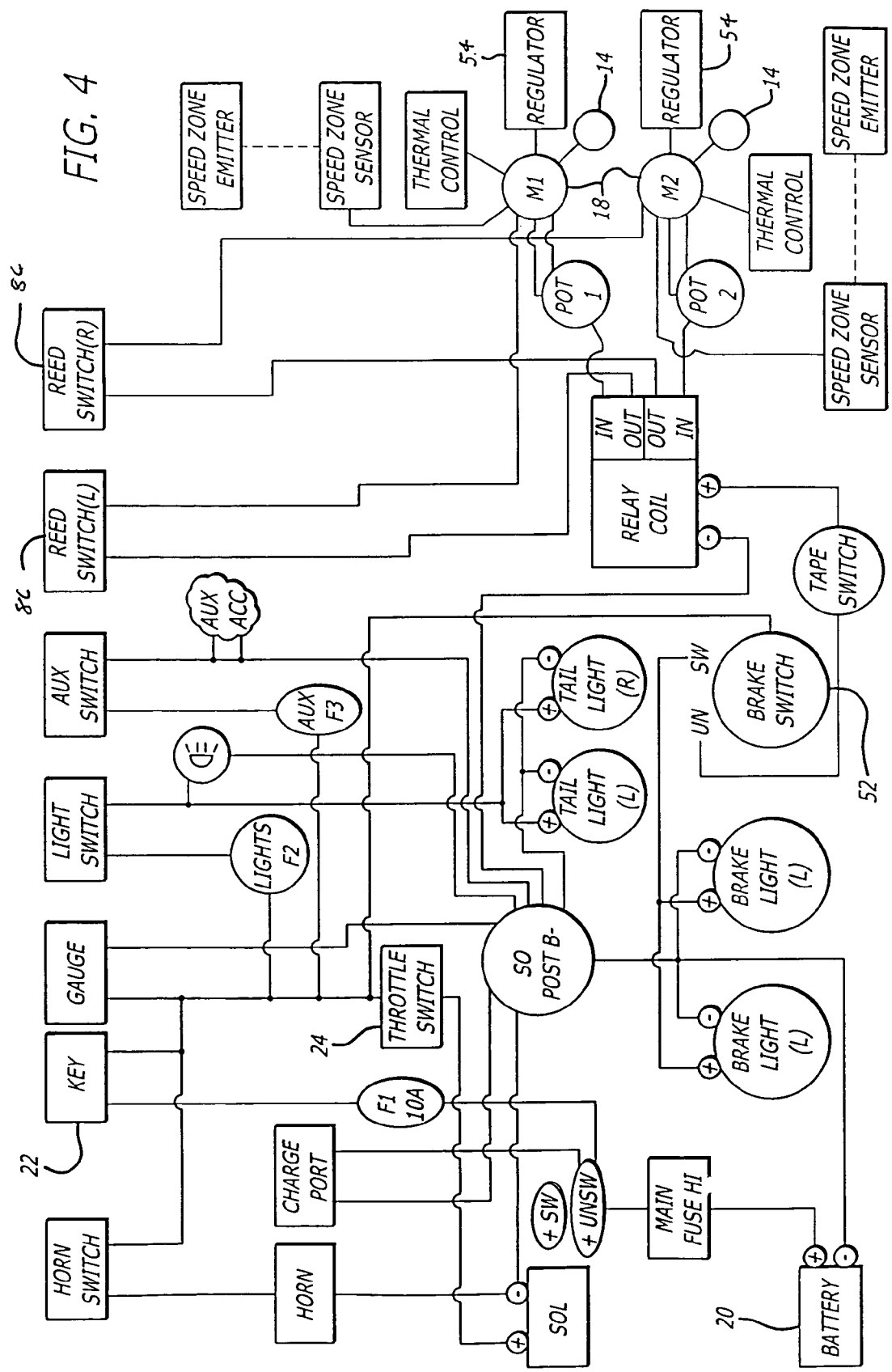
FIG. 4 is a schematic view of an electrical system in a personal transport vehicle, in accordance with aspects of the present invention.
Figure 14:
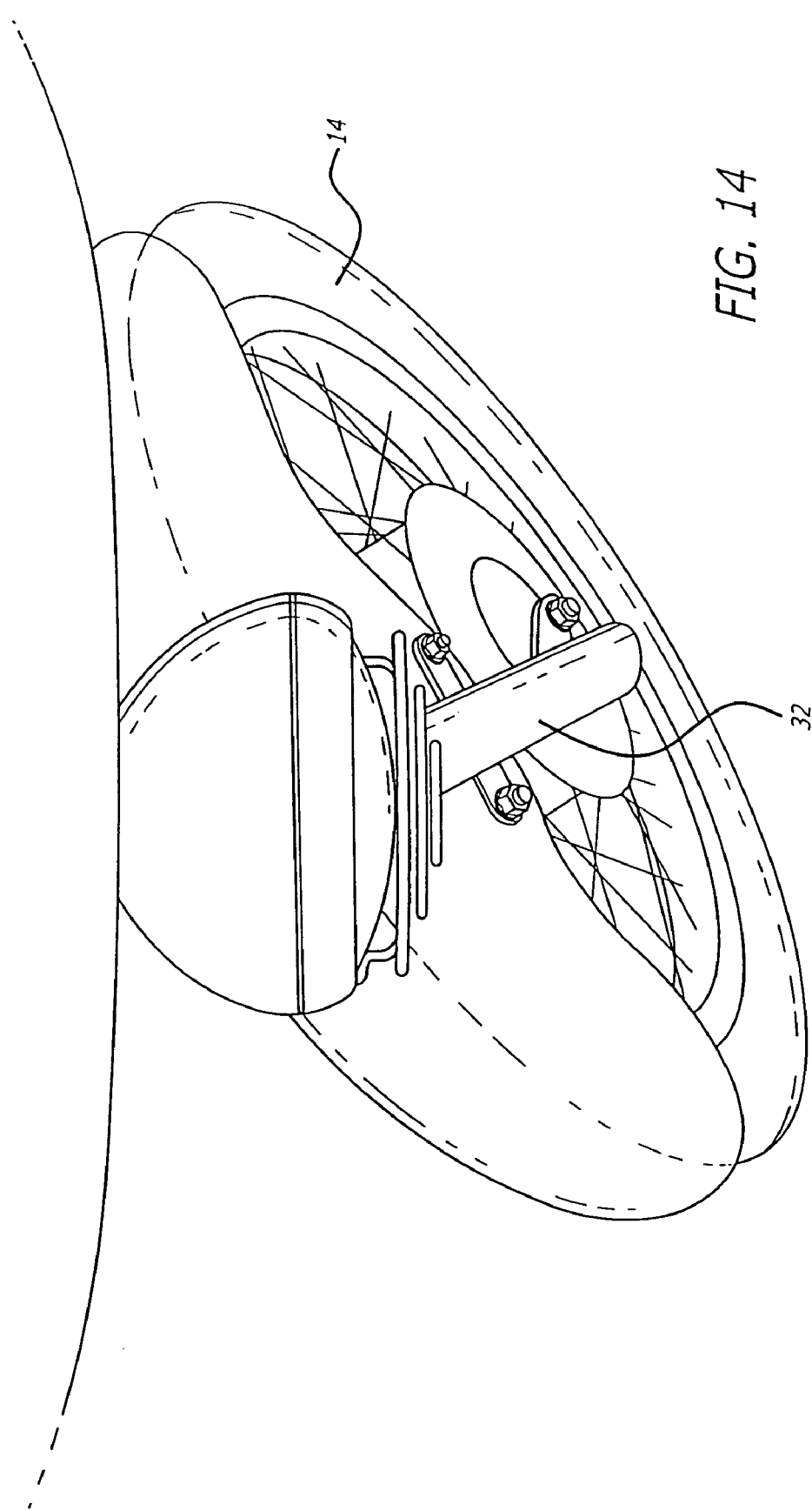
FIG. 14 is a perspective view of a steering hub assembly for a preferential drive in a personal transport vehicle.
Figure 15:
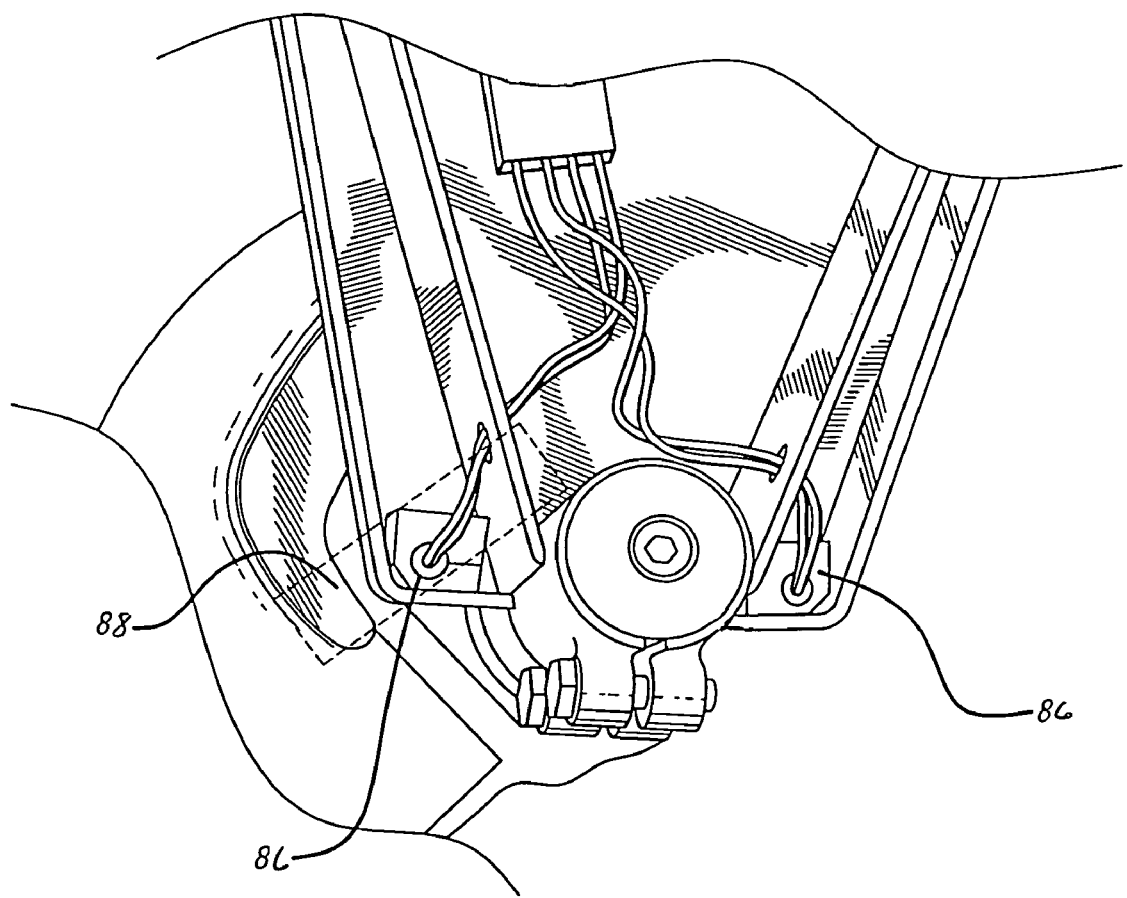
FIG. 15 is a top plan view of the front wheel assembly in a personal transport vehicle.

FIG. 4 shows a preferential drive 76, which may be included in the vehicle 10, and which includes a position sensor 86. The position sensor 86, as also seen in FIGS. 14-15, may comprise a pair of positionally-activatable switches 86, such as reed switches, each connected to a motor 18 and mounted on the handlebars 16, and the preferential drive 84 may further include a magnet 88, mounted in a dashboard 90. Upon turning the handlebars 16, whereby one positionally-activatable switch 86 is proximate the magnet 88, the motor 18 connected to the positionally-activatable switch 86 is regulated so as to be stalled or the current thereto to be limited, enabling the outside wheel to be powered for a sharp turn. The preferential drive 84 enables the one side wheel 14 to roll differently than the other wheel, such as slower or backwards, while the other side wheel 14 rolls faster or forward, when using the throttle 24, enabling the making of substantially sharp turns with the vehicle 10. The preferential drive 84 enables the center of gravity of the vehicle 10 to be low, enables the floor 26 of the cab 12 to be substantially as low as or lower than an axle, and enables the eliminating of a differential hump in the vehicle 10. It enables sharp cornering, prevents drawing excess current and heating up of the motor inside the turn, prevents the front wheel from pushing during the turn, and assists the center of gravity of the vehicle 10.

Figure 16:
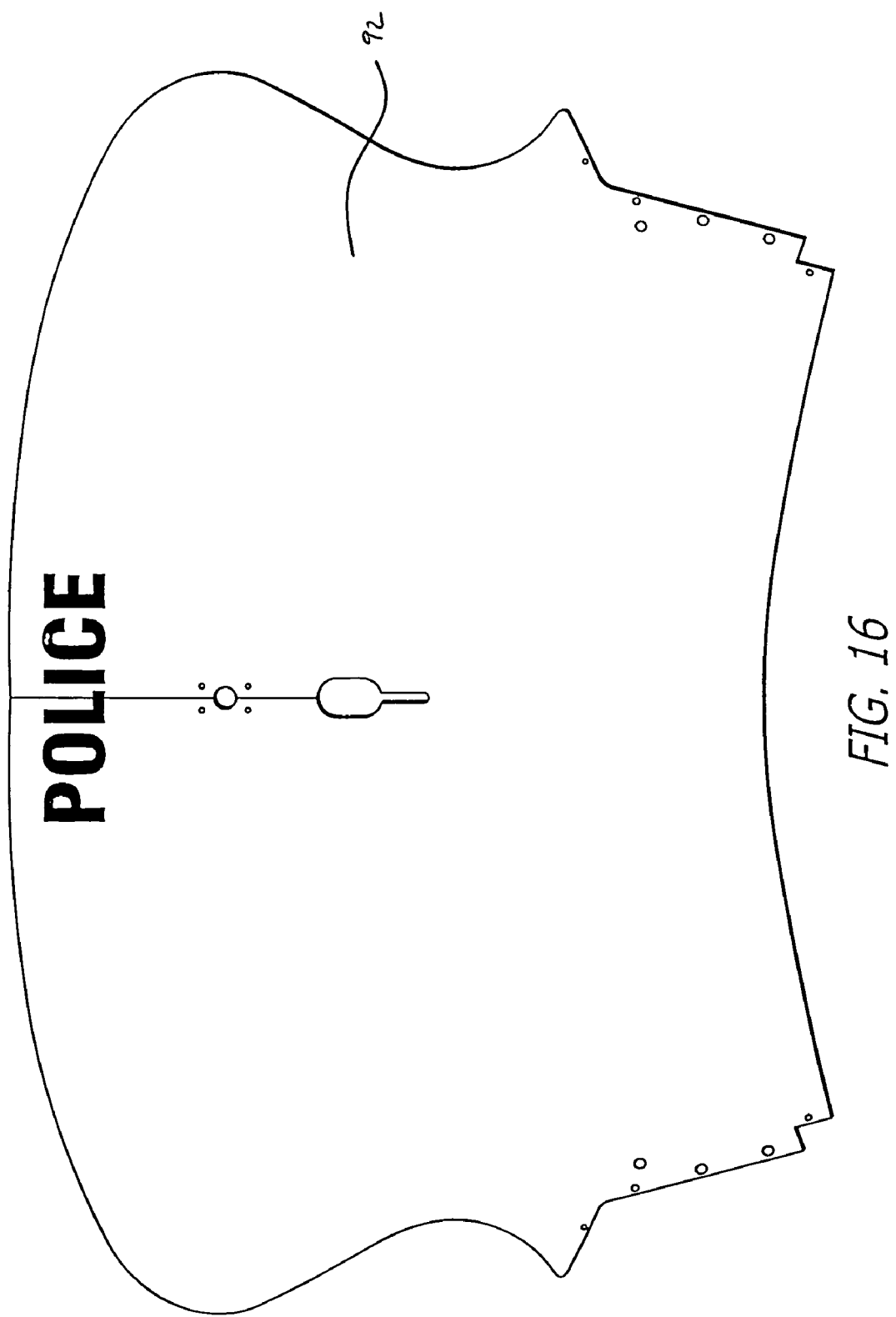
FIG. 16 is a front plan view of a cowling for a personal transport vehicle in accordance with the present invention.
Figure 17:
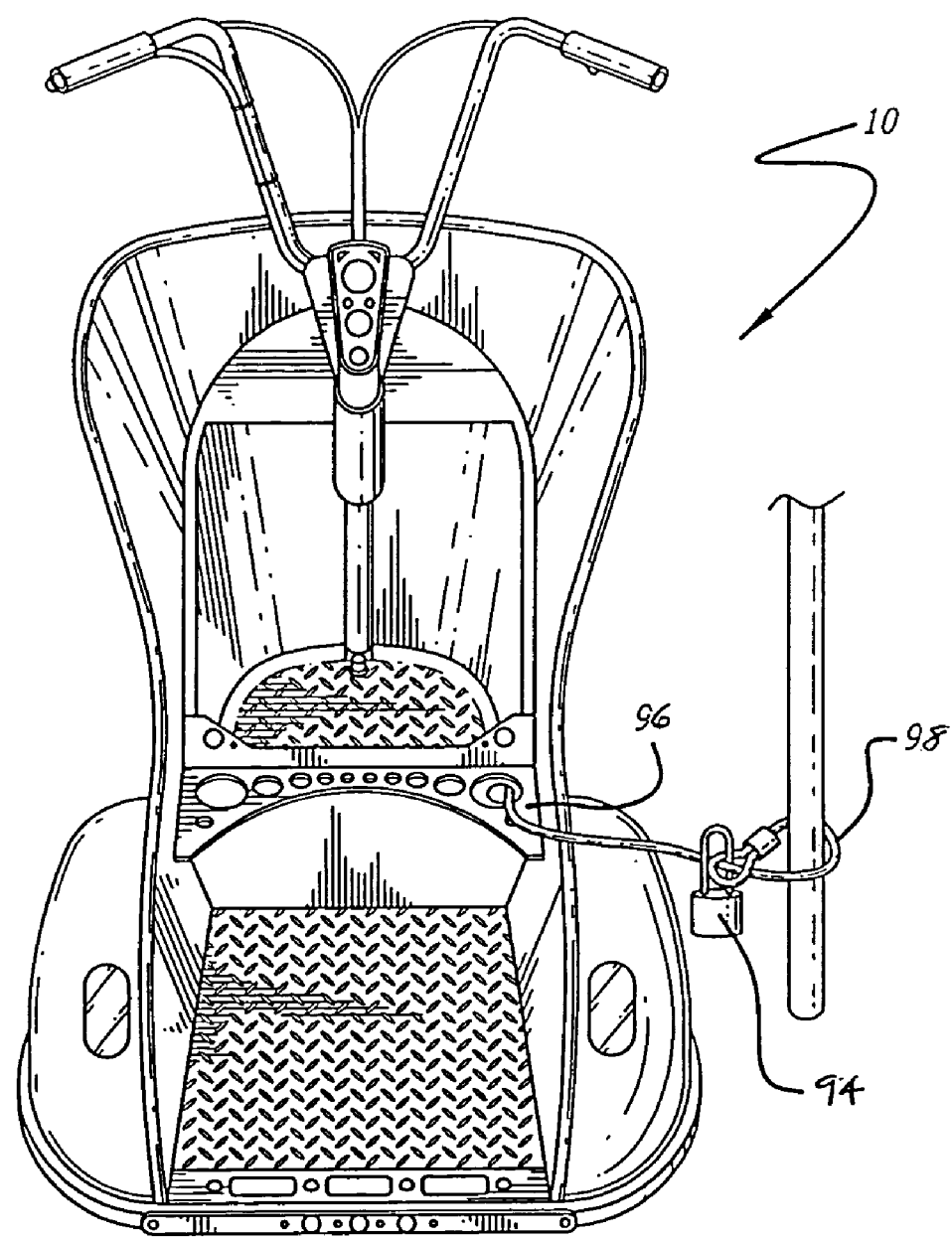
FIG. 17 is a rear perspective of a lock for a personal transport vehicle in accordance with the present invention.

As depicted in FIG. 16, the vehicle 10 further includes a cowling 92 which is able to be formed flat, enabling screen printing of custom graphics thereon, and which is then wrapped around the vehicle 10 for placement thereon. The cowling 92 may be readily removed and a new cowling 92 installed rapidly as desired. The vehicle 10 may also include a security lock 94, as illustrated in FIG. 17, for locking the vehicle 10. The lock 94 may comprise a key lock. The vehicle 10 further includes a frame 96, and the lock 94 may include a cable 98 which extends in the frame 96, and is extendable from the frame 96 to an external locking-enabling element for enabling locking thereto. The cable 98 may further be retractable for storing thereof.

Figure 18:
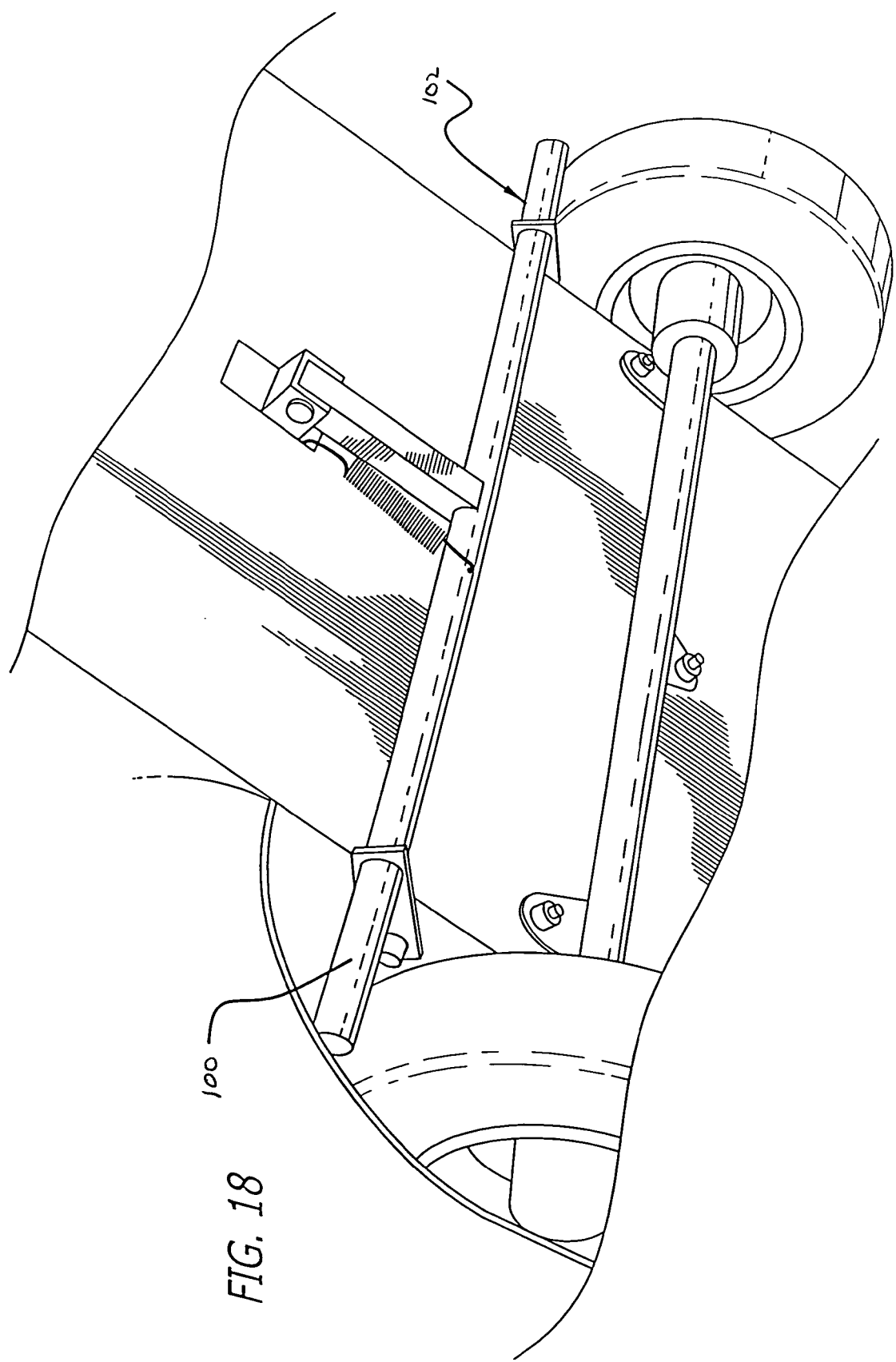
FIG. 18 is a bottom rear perspective of a braking assembly for a personal transport vehicle.
Figure 19:
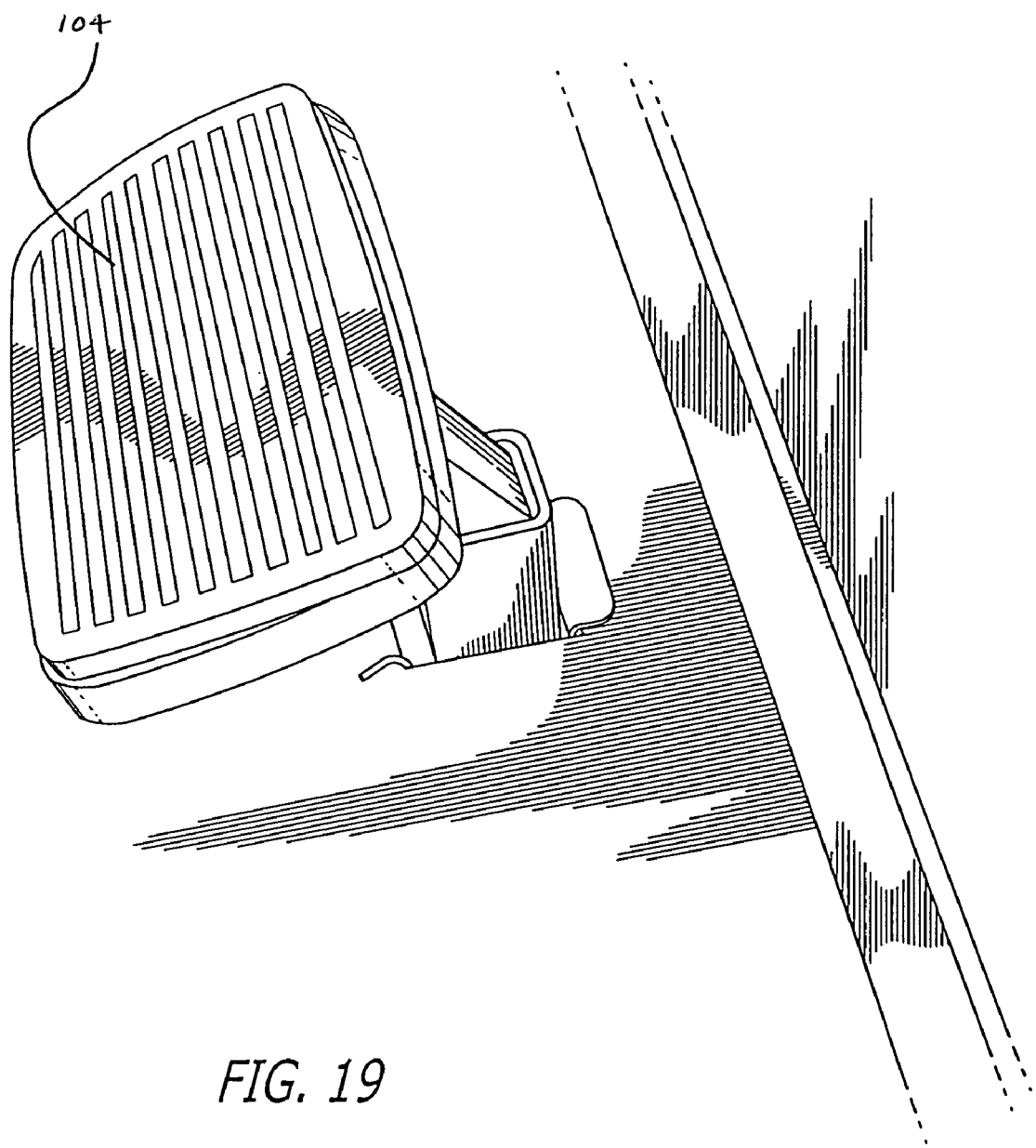
FIG. 19 is a top perspective view of a brake pedal for a braking assembly in a personal transport vehicle in accordance with aspects of the present invention.
Figure 20:
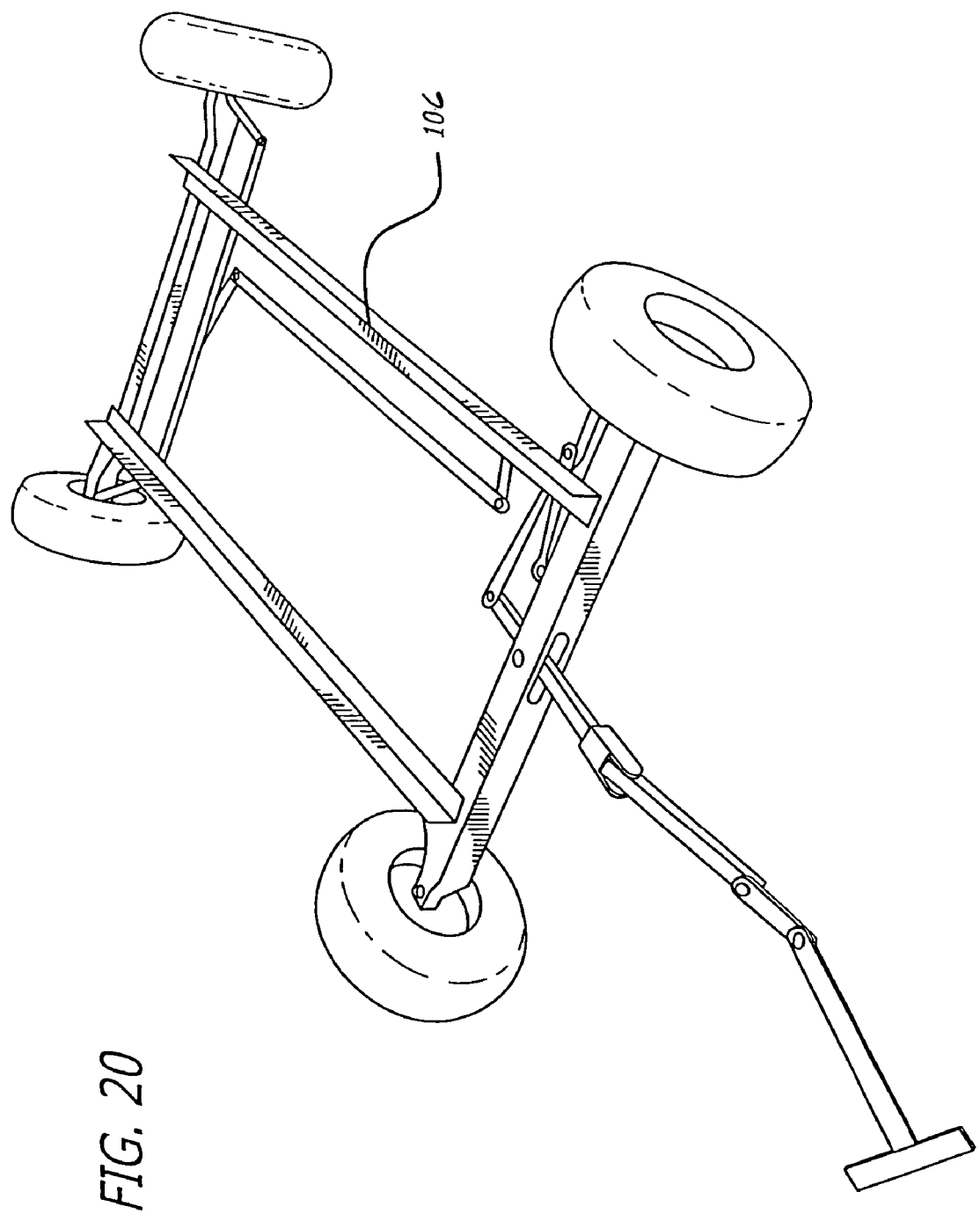
FIG. 20 is a perspective view of a trailer for a personal transport vehicle in accordance with the present invention.

The vehicle 10 may include an alternative or substitute braking system 100, as seen in FIGS. 18-19, which includes a braking bar 102, and a brake pedal 104, able to be depressed by the user to cause the bar 100 to engage the wheels 14. The pedal 104 may be sufficiently depressed to engage the bar 102 with the wheels 14, and further depressed into a pedal locking position which also locks the bar 102 in position, and may then be tapped to release the pedal 104 from locking position and to release the bar 102 from locking and engaging position. The vehicle 10 is further able to enable the carrying of a payload, as shown in FIG. 20, on a frame 106, which may comprise a trailer having front and rear steering to track with the vehicle 10, or in a locking trunk on the vehicle 10.

The cab 12, multiple wheels 14, steering element 16, motor 18, switch 22, and accelerator 24 are able to be mounted in a plurality of separable frame sub-systems, and the plurality of separable frame sub-systems are able to be separated into a plurality of separate frame sub-systems to enable shipment thereof. The plurality of separable and separate frame sub-systems may comprise two separable and separate frame sub-systems. All vehicle systems including the braking system and the electrical system, may also be disconnected and separable into two separable sub-systems for enabling shipment thereof. The system 10 further includes a medial portion, and the plurality of separable sub-systems are separable at the medial portion.

To use the personal transport vehicle 10 of the present invention, the person to be transported is able to stand in the cab 12, activate the switch 22, the power element 20, and the motor 18, activate the accelerator 24, steer the steering element 16, and be transported in the cab 12 on the multiple wheels 14. It also enables locking of the battery 20 in the battery compartment 38 and rapid release of the battery 20, by the battery locking and rapidly releasing element 40. Also, it enables braking by the bi-directional band braking system 56. It enables stalling of the motor 18 connected to one of the multiple wheels 14 when the handlebars 16 are turned substantially in the direction of one wheel 14, enabling the one wheel 14 to roll backwards while another wheel 14 rolls forward, by the preferential drive 84.

Transport of a person in the vehicle 10 is further enabled on the multiple suspensions 30 associated with each of the multiple wheels 14. It also enables the maintaining of the adjustment of the fork bearings 36 upon removal of the handlebars 16 for shipping, by the fork 32. Further, it enables the torque to be fixed by the head angle between the head tube 34 and the ground. It further enables the plurality of batteries 20 to be installed in series, removed individually, and charged in parallel, by the plurality of battery compartments 38. It also enables forming the cowling 92 flat, enabling screen printing on the cowling 92, and enabling the cowling 92 to be wrapped around for placement on the vehicle 10. Also, it further enables the carrying of a payload on the trailer 106.

The operation of the vehicle 10 further causes the adult rider to lean in the direction of the turn, by turning the handlebars 16 on the substantially lightweight vehicle 10. It further enables activating the throttle 24, and provides substantially smooth and non-jerky movement, by the underpowered motors 18. It further provides substantially smoother movement by the delayed reaction time period upon applying full throttle, in the delay in the electrical circuit when the revolutions per minute are below the preset level. It further provides substantially instantaneous response by bypassing the delay when the revolutions per minute are above the preset level. It further regulates the speed of the vehicle 10, through the motor 18, for providing smooth and quiet movement with little vibration, by engaging the throttle 24 slowly up to a preset low speed limit point. It further enables full throttle to the motor 18, upon passing the preset low speed limit point.

The vehicle 10 further enables control of the heat and prevents burnout, by the motor thermal control. It alternatively is able to be powered by a fuel cell, or a hybrid combination of fuel and electric power. The vehicle 10 enables transporting on the pair of side wheels 14 and the front wheel 14. It further inputs to the motor 18 the maximum vehicle speed limit by the regulator 54. It further keeps the weight of the person forward in the vehicle 10 for safety, by the electrical safety strip 28, and prevents movement of the vehicle 10 unless the person is standing on the strip 28. Also, it provides lightweight strong material vehicle components. The vehicle 10 further enables locking thereof by the lock 94. The method for use of the vehicle 10 further enables separating of the plurality of separable sub-systems, by the plurality of separable sub-systems.

While the particular personal transport vehicle as shown and disclosed in detail herein is fully capable of obtaining the objects and providing the advantages previously stated, it is to be understood that it is merely illustrative of the presently preferred embodiment of the invention, and that no limitations are intended to the details of construction or design shown herein other than as described in the appended claims.

We claim:

1. A system for enabling a person to be transported, comprising a personal transport vehicle, which comprises a cab, multiple wheels, on which the cab is mounted, a motor, connected to at least one of the multiple wheels, a power element, for providing power to the motor, a switch, for enabling starting of the motor, a steering element, for enabling steering of the vehicle, wherein the steering element comprises handlebars, and the accelerator comprises a throttle, further comprising a preferential drive, including a positionally-activatable switch for regulating a motor connected to one of the multiple wheels when the handlebars are turned substantially in the direction of the one wheel, enabling the one wheel to roll differently than another wheel, when using the throttle, enabling the making of substantially sharp turns with the vehicle, and an accelerator, mounted on the steering element, wherein the system enables a person to stand in the cab, activate the starter, the power element, and the motor, activate the accelerator, steer the steering element, and be transported in the cab on the multiple wheels.

2. The system of claim 1, wherein the vehicle includes an axle, and the steering element comprises handlebars, further including a head tube, and a fork, adapted to be secured to the handlebars, and a head angle between the head tube and the ground, and wherein the relationship between the head angle and the axle is adapted to determine the trail, comprising the distance on the ground, for enabling the torque to be fixed.

3. The system of claim 1, wherein the accelerator comprises a throttle, further including an electrical circuit, adapted to connect the throttle to the motor which is connected to the wheel, further comprising a delay in the electrical circuit when the revolutions per minute are below a preset level, so as to divide the acceleration over a period of time, to provide a delayed reaction time period upon applying full throttle to provide substantially smooth movement, which delay is bypassed when the revolutions per minute are above the preset level to provide substantially instantaneous response.

4. The system of claim 1, wherein the accelerator comprises a throttle further comprising a regulator, adapted to regulate the speed of the vehicle through the motor when the throttle is engaged slowly up to a preset low speed limit point, for providing smooth and quiet movement with little vibration, and upon passing the preset low speed limit point, to enable full throttle to the motor.

5. The system of claim 4, wherein the regulator comprises a current limit switch, adapted to limit the current to the motor up to the preset low speed limit point, and to be bypassed to enable full current to the motor.

6. The system of claim 4, wherein the regulator comprises a smart regulator, adapted to regulate the vehicle speed dependent upon an external factor.

7. The system of claim 6, wherein the external factor comprises the time of day when the vehicle is being operated.

8. The system of claim 6, wherein the external factor comprises the area where the vehicle is being operated.

9. The system of claim 6, wherein the external factor comprises the person operating the vehicle.

10. The system of claim 4, wherein the regulator includes a microprocessor.

11. The system of claim 4, further including a speed zone sensor, for sensing a speed zone code for regulating the vehicle speed, and further comprising a speed zone emitter, adapted to emit a speed zone code to be sensed by the speed zone sensor.

12. The system of claim 11, wherein the speed zone sensor comprises a radio sensor.

13. The system of claim 11, wherein the speed zone sensor comprises an optical sensor.

14. The system of claim 1, further including a braking system which includes a braking bar, able to engage the wheels, and a brake pedal, connected to the braking bar, which, upon being depressed, causes the braking bar to engage the wheels.

15. The system of claim 14, wherein the brake pedal is adapted to be depressed to engage the braking bar with the wheels, and to be further depressed to lock the braking bar in engagement with the wheels, and is further adapted to be tapped to release the braking bar from locking and engaging position.

16. The system of claim 1, further comprising a bi-directional band braking system, and further including an axle, a brake drum, adapted to be attached to the axle, and wherein the bi-directional braking system includes a band, adapted to extend about the brake drum, which includes a braking-enabling lining on the inner surface thereof able to be pulled so as to bear against the brake drum, a first end, and a second opposed end, a first lever which includes a first pin to which the first end of the band is connected and a first cable stop connected to the first pin, a second lever which includes a second pin to which the second end of the band is connected and a second cable stop connected to the second pin, whereby upon movement of the wheel in a first direction and operation of the first lever, the first pin is fixed in relation to the second pin, to enable braking of the wheel moving in the first direction, and upon movement of the wheel in a second opposite direction and operation of the second lever, the second pin is fixed in relation to the first pin, to enable braking of the wheel moving in the second opposite direction.

17. The system of claim 1, wherein the preferential drive enables the center of gravity of the vehicle to be low, enables the floor of the cab to be as substantially low as the axle, and enabling the eliminating of a differential hump in a vehicle.

18. The system of claim 17, wherein the maximum speed limit regulator is operable in conjunction with radio control and/or sensors in the surface on which the vehicle is driven, to limit the maximum speed thereof.

19. The system of claim 1, wherein the positionally-activatable switch comprises a pair of magnetically-activatable switches, each connected to a motor, and a magnet, such that upon turning the handlebars whereby one magnetically-activatable switch moves proximate the magnet, the motor connected to the one magnetically-activatable switch is regulated thereby.

20. The system of claim 19, wherein the pair of magnetically-activatable switches comprise a pair of reed switches.

21. The system of claim 1, further comprising a maximum speed limited regulator, adapted to input to the motor a maximum speed limit for the vehicle, wherein the maximum speed limit regulator comprises a smart system, including a microprocessor, dependent upon factors relating to the person driving the vehicle, the time the vehicle is being driven and/or the location where the vehicle is being driven.

22. The system of claim 1, wherein the battery locking and rapidly releasing element comprises a battery compartment lever, adapted to be pivotally movable between a battery connecting and locking position and a battery disconnecting and rapidly releasing position, wherein the power element comprises a battery, further including a battery compartment, adapted to enable the battery to be positioned therein and removed therefrom, and a battery locking and rapidly releasing element, adapted to enable locking of the battery in the battery compartment and rapid release of the battery to enable rapid replacement thereof, further including an electrical system, and wherein the battery compartment further includes a battery plug, connected to the vehicle electrical system, a plug socket, and a plug slide, on which the plug socket is mounted, adapted to enable slidable movement of the battery plug so as to enable the disconnection of the battery plug from the plug socket and the battery upon rapidly releasing movement of the battery disconnect lever, and to enable connection of the battery plug to the plug socket and the battery upon locking movement of the battery disconnect lever.

23. The system of claim 1, wherein the power element comprises a battery, further including a battery compartment, adapted to enable the battery to be positioned therein and removed therefrom, and a battery locking and rapidly releasing element, adapted to enable locking of the battery in the battery compartment and rapid release of the battery to enable rapid replacement thereof, wherein the battery locking and rapidly releasing element comprises a battery compartment lever, adapted to be pivotally movable between a battery connecting and locking position and a battery disconnecting and rapidly releasing position, wherein the battery compartment includes a portion of the cab floor and a battery tray, and the battery locking and rapidly releasing element extends through the cab floor portion, and wherein the cab floor portion is removable to enable removal of a battery, and is adapted not to be re-positionable until the battery disconnect lever is in locking position and the battery plug is plugged into a battery.

24. The system of claim 1, wherein the power element comprises a battery, further including a battery compartment, adapted to enable the battery to be positioned therein and removed therefrom, and a battery locking and rapidly releasing element, adapted to enable locking of the battery in the battery compartment and rapid release of the battery to enable rapid replacement thereof, wherein the battery locking and rapidly releasing element comprises a battery compartment lever, adapted to be pivotally movable between a battery connecting and locking position and a battery disconnecting and rapidly releasing position, wherein the battery compartment includes a portion of the cab floor and a battery tray, and the battery locking and rapidly releasing element extends through the cab floor portion, and wherein the cab floor further includes an indentation notch, adapted to bear against the battery plug in the battery compartment and prevent the battery plug from becoming unplugged upon locking of the battery disconnect lever and connection of the battery plug with a battery, and to prevent re-positioning of the cab floor if the battery plug is unplugged from a battery.

25. A method of enabling a person to be transported, comprising a personal transport vehicle, in a system which comprises a cab, multiple wheels, on which the cab is mounted, a motor, connected to at least one of the multiple wheels, a power element, for providing power to the motor, a switch, for enabling starting of the motor, a steering element, for enabling steering of the vehicle, and an accelerator, mounted on the steering element, wherein the system enables a person to stand in the cab, activate the switch, the power element, and the motor, activate the accelerator, steer the steering element, and be transported in the cab on the multiple wheels, wherein the method comprises:
    enabling the person to stand in the cab, and enabling activating of the starter, the power element, and the motor, activating the accelerator, steering the steering element, and transporting the person in the cab on the multiple wheels, by the multiple-wheel motorized personal transport vehicle, wherein the steering element comprises handlebars, and the accelerator comprises a throttle, further comprising a preferential drive, including a positionally-activatable switch for regulating a motor connected to one of the multiple wheels when the handlebars are turned substantially in the direction of the one wheel, enabling the one wheel to roll differently than another wheel, when using the throttle, enabling the making of substantially sharp turns with the vehicle, and the method further comprises enabling the regulating of the motor connected to one of the multiple wheels when the handlebars are turned substantially in the direction of the one wheel, enabling the one wheel to roll differently than another wheel, by the preferential drive.

26. The method of claim 25, wherein the accelerator comprises a throttle, further including an electrical circuit, adapted to connect the throttle to the motor which is connected to the wheel, further comprising a delay in the electrical circuit when the revolutions per minute are below a preset level, so as to divide the acceleration over a period of time, to provide a delayed reaction time period upon applying full throttle to provide substantially smooth movement, which delay is bypassed when the revolutions per minute are above the preset level to provide substantially instantaneous response, and further comprising providing substantially smooth movement by the delayed reaction time period upon applying full throttle, in the delay in the electrical circuit when the revolutions per minute are below the preset level.

27. The method of claim 26, further comprising providing substantially instantaneous response by bypassing the delay when the revolutions per minute are above the preset level.

28. The method of claim 25, wherein the accelerator comprises a throttle further comprising a regulator, adapted to regulate the speed of the vehicle through the motor when the throttle is engaged slowly up to a preset low speed limit point, for providing smooth and quiet movement with little vibration, and upon passing the preset low speed limit point, to enable full throttle to the motor, and further comprising regulating the speed of the vehicle, through the motor, for providing smooth and quiet movement with little vibration, by engaging the throttle slowly up to a preset low speed limit point.

29. The method of claim 28, further comprising enabling full throttle to the motor, upon passing the preset low speed limit point.

* * * * *